(12) United States Patent
Pedersen et al.

(10) Patent No.: US 9,392,802 B2
(45) Date of Patent: Jul. 19, 2016

(54) METHOD AND AN APPARATUS FOR PROCESSING BIRDS ON A CONVEYOR

(71) Applicant: LINCO FOOD SYSTEMS A/S, Trige (DK)

(72) Inventors: Per Pedersen, Hinnerup (DK); Jonas Jensen, Hobro (DK); Anders Jul Håkonsen, Århus V (DK)

(73) Assignee: LINCO FOOD SYSTEMS A/S, Trige (DK)

( * ) Notice: Subject to any disclaimer, the term of this patent is extended or adjusted under 35 U.S.C. 154(b) by 0 days.

(21) Appl. No.: 14/433,994

(22) PCT Filed: Oct. 10, 2013

(86) PCT No.: PCT/DK2013/050320
§ 371 (c)(1),
(2) Date: Apr. 7, 2015

(87) PCT Pub. No.: WO2014/056506
PCT Pub. Date: Apr. 17, 2014

(65) Prior Publication Data
US 2015/0272141 A1    Oct. 1, 2015

(30) Foreign Application Priority Data
Oct. 10, 2012    (DK) .................................. 2012 70619

(51) Int. Cl.
*A22C 21/00*    (2006.01)
(52) U.S. Cl.
CPC .......... *A22C 21/0053* (2013.01); *A22C 21/0007* (2013.01)
(58) Field of Classification Search
CPC ........ A22C 17/00; A22C 18/00; A22C 21/00; A22C 21/0007; A22C 21/0053
USPC .......................................... 452/177, 179–183
See application file for complete search history.

(56) References Cited

U.S. PATENT DOCUMENTS

| 3,643,293 A | 2/1972 | Rejsa et al. |
| 3,797,068 A | 3/1974 | Dillon |

(Continued)

FOREIGN PATENT DOCUMENTS

| EP | 0225306 A2 | 6/1987 |
| EP | 1097644 A1 | 5/2001 |

(Continued)

OTHER PUBLICATIONS

International Search Report for PCT/DK2013/050320, mailed Jan. 23, 2014; ISA/EP.

(Continued)

*Primary Examiner* — Richard Price, Jr.
(74) *Attorney, Agent, or Firm* — Harness, Dickey & Pierce, PLC (57) ABSTRACT

An apparatus for processing birds on a conveyor according to the invention includes a moveable engagement member (1,101,201,301) having a contacting surface (11,111,211,311) adapted for being brought into contact with the bird (2). The engagement member is connected to a carrier (30,130,230,330) at a primary axis (P), said carrier being rotatable about a stationary secondary axis (132,232,332) and the primary axis (P) being located on the carrier (30,130,230, 330) at a distance from the secondary axis (132,232,332), so that said primary axis will rotate about the secondary axis when the carrier is rotated. The engagement member (1,101, 201,301) is restrained between the primary axis and the contacting surface, so that the contacting surface is prevented from rotating about the secondary axis. The invention also relates to a method for processing birds on a conveyor, where, during a processing movement, the direction of movement of contacting surface is preferably substantially the same as the direction of the conveyor.

25 Claims, 5 Drawing Sheets

(56) References Cited

U.S. PATENT DOCUMENTS

| | | |
|---|---|---|
| 4,756,056 A | 7/1988 | Innes et al. |
| 4,791,704 A | 12/1988 | Chapman |
| 5,453,045 A * | 9/1995 | Hobbel ............... A22C 21/0053 452/182 |
| 5,672,098 A * | 9/1997 | Veraart ................. B65G 47/61 452/182 |
| 6,010,398 A * | 1/2000 | Mente ................ A22C 21/0053 452/179 |
| 7,018,283 B2 * | 3/2006 | Schmidt ............. A22C 21/0053 452/179 |
| 8,657,102 B2 * | 2/2014 | Krebs ................ A22C 21/0053 198/465.4 |

FOREIGN PATENT DOCUMENTS

| | | |
|---|---|---|
| EP | 1922935 A1 | 5/2008 |
| GB | 1080608 A | 8/1967 |
| GB | 1484241 A | 9/1977 |
| NL | 1020579 C2 | 10/2002 |
| NL | 1022232 C2 | 6/2004 |

OTHER PUBLICATIONS

International Preliminary Report on Patentability (Chapter II) for PCT/DK2013/050320, dated Sep. 16, 2014; IPEA/EP.

* cited by examiner

METHOD AND AN APPARATUS FOR PROCESSING BIRDS ON A CONVEYOR

CROSS-REFERENCE TO RELATED APPLICATIONS

This application is a 371 U.S. National Stage of International Application No. PCT/DK2013/050320, filed on Oct. 10, 2013, which claims priority to Danish Patent Application No. PA 2012 70619, filed on Oct. 10, 2012. The entire disclosures of the above applications are incorporated herein by reference.

The present invention relates to an apparatus for processing birds on a conveyor, including a moveable engagement member having a contacting surface adapted for being brought into contact with the bird, and to a method for processing birds on a conveyor.

Such an apparatus and method used for taking down birds hanging by the legs from shackles on a conveyor is known from EP1922935. This publication discloses the use of a rod-shaped engagement member, which is swung between a passive position remote from the path of the conveyor and an active position, where the rod is substantially parallel to the path of the conveyor. The engagement member is curved so that when the shackle holding the bird moves forward on the conveyor, the contact between the legs of the bird and the engagement member causes the legs to be gradually pushed upwards and outwards in the shackle until it loses contact therewith.

This prior art method is very reliable due to its mechanical simplicity and has found widespread use, but the ever increasing running speeds of the conveyors used in poultry slaughterhouses has shown an upper limit to its applicability. When the running speed becomes too high, the number of errors, where the bird is not taken down properly or where the bird hanging before or after a bird selected to be taken down is also affected, becomes unacceptable.

U.S. Pat. No. 4,791,704 describes another method and apparatus of taking down birds, where a series of engagement members are arranged on a carrousel and are shifted outwards to make the distance between the engagement members larger when they are engaging the birds. This allows transfer of birds from one conveyor, where birds are hanging relatively far apart, to another, where they are hanging closer to each other. This functions well at moderate speeds, but at high speeds there is a substantial risk of errors for example due to an engagement member hitting a bird hanging next to the one, which it is intended to engage. Moreover, this method and apparatus is only capable of processing all birds on a conveyor and does not allow the processing of only selected birds.

It is therefore the object of the invention to provide an apparatus and a method for processing birds on a conveyor, which are suited for very high conveyor speeds. Particularly it is object to provide an apparatus and a method for processing only selected birds on the conveyor, and more particularly for taking down selected birds from shackles on an overhead conveyor.

This is achieved with an apparatus where the engagement member is connected to a carrier at a primary axis, said carrier being rotatable about a stationary secondary axis and the primary axis being located on the carrier at a distance from the secondary axis, so that said primary axis will rotate about the secondary axis, when the carrier is rotated, where both the primary axis and the secondary axis are located at a distance perpendicular to the primary axis from the intended path of the conveyor, and where the engagement member is restrained by one or more restraints located between the primary axis and the contacting surface, so that the contacting surface is prevented from rotating about the secondary axis.

The object is further achieved with a method, where the contacting surface is moved along a path constituted by an inward movement from a passive position into the path of the conveyor, a processing movement which is substantially following the path of the conveyor, and an outward movement out of the path of the conveyor and back to the passive position, said inward and outward movements following the same direction of rotation, where the engagement member is connected to a carrier at the primary axis and said carrier being rotated about a stationary secondary axis, where the primary axis is located on the carrier at a distance from the secondary axis, so that said primary axis rotates about the secondary axis, and where the engagement member is restrained at one or more points between the primary axis and the contacting surface, so that the contacting surface is prevented from rotating about the secondary axis.

Rotation of the carrier about the secondary axis means that the part of the engagement member at the primary axis performs a rotation about the secondary axis, while a connector member defining the primary axis rotates in relation to the engagement member. As an example, the carrier may include a pin projecting through a hole in the engagement member and defining the primary axis. The rotation of the carrier will then cause the pin to perform a circular motion about the secondary axis and thus a full rotation in the hole in the engagement member. Rotation of the carrier may for example be driven by a drive shaft in the form of a crankshaft and a base member of the apparatus may be used as a base for mounting the carrier, the engagement member and/or the restraints.

The restraints keeping the engagement member from rotating, may be simple stops arranged on a base member of the apparatus on either side of the engagement member and keeping it from moving to the side beyond a certain point. Alternatively or a supplement, the engagement member can be provided with a slot arrange to run over a stop on a base member.

When the carrier is rotated in one direction, the proximal end of the engagement member, where the primary axis is located, is forced to follow the rotation, and due to the restraint(s) the distal end with the contacting surface is then forced to rotate in the opposite direction. The resulting overall pattern of movement of the engagement member is thus of the shape of the number eight, each end of the engagement member following oppositely directed closed-loop paths. It is noted that the rotation performed by the distal end of the engagement member and hence the contacting surface is not necessarily a circular rotation, but that the path followed by a particular point on the contacting surface may for example be oval or have the overall shape of a drop.

In comparison to U.S. Pat. No. 4,791,704 the restraint on the movement of the engagement member means that the entire engagement member does not rotate with the carrier. Accordingly, there is no need for a series of engagement members on a carrousel and hence the risk of erroneous contact at high speeds is considerably reduced.

The rotating or revolving path of the contacting surface has the advantage over a swinging motion as known from EP1922935 that the movement into and out of the path of the birds is continuous, which also allows a shortening of the duration of the total movement. In this respect it is noted that the use of the term "continuous" is not intended to mean that the movement has a constant speed, only that the engagement member follows different paths into and out of the path of the birds. As an example the initial part of the rotation, where the engagement member is moved inward from a passive position towards the path of the conveyor, may be relatively fast, whereupon the speed is reduced during the actual processing and then increased again during the outward movement for quickly bringing the engagement member out of the path of the birds. This means that the engagement member can be brought out of the path of the birds travelling on the conveyor much faster, thus minimizing the risk of it hitting or being hit by other birds than the one to be processed.

Moreover, when using the apparatus and method for taking down birds from shackles on a conveyor, the movement of the engagement member means that its kinetic energy contributes to forcing the legs out of the shackle, leading to a much faster take-down process than with the stationary engagement member in EP1922935. It is noted that any reference in this text to a take-down process is intended to cover not only processes, where birds are taken down in the literal sense, but also those where they are transferred to shackles or like holders on another conveyor.

The direction of the rotation of the carrier and hence the end of the engagement member where the primary axis is located is preferably such that during the processing movement the direction of movement of the contacting surface is substantially the same as the direction of the conveyor. In this way the period of contact between the legs of the bird and the engagement member can be longer than if the contacting surface is rotated in the opposite direction and during the processing the contacting surface is preferably moved at a speed corresponding substantially to the speed of the conveyor. When using the apparatus and method for taking birds down from shackles, this unidirectional movement has the further advantage that the loads resulting from the impact, when the engagement member hits the legs, are proportionally smaller, leading to a reduced risk of damages to the bird.

It is noted that while the contacting surface follows a curved path and the path of the conveyor may be linear at the take-down station, the tangential direction of movement of the contacting surface will at least at one point be substantially parallel to the path of the conveyor and hence to the direction of movement of the birds.

Depending on the overall design of the apparatus, the distance between the primary axis and the contacting surface is preferably in the interval 5-40 cm, more preferred 10-30 cm when intended for processing chickens. If designing the apparatus for processing birds that are considerably smaller or larger than chickens, such as quails or turkeys, these dimensions may need adaptation.

The shape of the engagement member will depend on the type of processing and on the pattern of movement. In one embodiment the contacting part of the engagement member, which includes the contacting surface, is preferably a rounded projection, the engagement member for example having the shape of a drop with the primary axis at the pointed end. The contacting surface may be a simple surface intended for pushing or pressing on the bird, a sharpened edge intended for cutting the bird and/or carry additional tools intended for cutting or performing other operations on the bird. In another embodiment the engagement member has the overall shape of a triangle when seen in the direction of the primary axis, one side of the triangle forming the contacting surface and the primary axis being located at a vertex of the triangle located opposite the contacting surface.

When using the apparatus and method for taking down birds from shackles on a conveyor the contacting surface is brought into contact with the legs of a bird hung from a shackle on the conveyor thereby pushing them out of the shackle. The contacting surface may then come into contact with one leg at a time, preferably contacting the upstream leg before the downstream leg, when seen in the direction of movement of the conveyor. For this purpose the contacting surface may include two or more sections each intended for engaging one of the legs and possibly being arranged at different angles in the plane defined by the movement of the engagement member. It is also possible to have two separate contacting surfaces adapted for contacting one leg each or the engagement member may be given an undulating shape, forming a series of contacting surface arranged adjacent to each other, so that each leg of the bird is contacted several times causing it to be gradually forced further out of the shackle.

Engagement members having a contacting surface with two or more sections or having two or more separate contacting surfaces may also be used for other purposes, an example being that one section or surface is flat and intended for abutting the bird, while another is sharpened and intended for cutting. It is also possible to provide the apparatus with two or more engagement members serving different purposes. As an example, one may abut on the bird to achieve a well-defined positioning, while another is intended for performing the actual processing. Two contacting surfaces or sections of a contacting surface may be arranged at an angle to each other, not only in the plane defined by the movement of the engagement member as described above, but also in a plane perpendicular thereto. As an example one contacting surface may be substantially horizontal and adapted for engaging both legs of the bird, while another contacting surface or section of a contacting surface is substantially vertical and adapted for engaging the breast of the bird to make a cut along the sternum. With such an embodiment it is even possible to make a cut and to take down the thus processed bird in a single apparatus if the movement of the engagement member or members is appropriately coordinated.

It is noted that "the contacting surface" is simply to be understood as the part of the surface of the engagement member, which actually comes into contact with the bird, and that it is not necessarily separate from the rest of the surface. On the contrary, when using the apparatus and method for taking down birds from shackles on a conveyor it will typically be advantageous that the surface of the engagement member is as smooth and rounded as possible.

In one embodiment the primary axis is substantially vertical and the engagement member moved in a substantially horizontal plane, thus also leading to a substantially horizontal path of movement of the contacting surface of the engagement member.

Other patterns of movement are of course possible. As an example a rotation about an inclined axis may result in the force of the engagement member when contacting the bird being applied obliquely. When using the apparatus and method for taking down birds from shackles on a conveyor, such an oblique engagement from below may help force the legs of the bird out of the shackle.

In a relatively complex embodiment, the engagement member has the shape of the number eight so that one engagement member may be used for processing birds on two parallel conveyors if it is arranged between them, each end of the engagement member serving as a contacting surface.

The engagement member itself is preferably relatively flat, meaning that the height of the engagement member seen in the direction of the primary axis is smaller than the distance between the primary axis and the contacting surface. This entails that the contacting surface is relatively small, leading to a low air resistance, and that the weight of the engagement member is also relatively low. The contacting surface should, however, not be so small that there is a risk of damaging the birds unintentionally and the engagement member should have sufficient strength and stiffness to endure the forces encountered when engaging the birds.

When used for taking down chickens from a conveyor, the engagement member may for example made from a sheet of polyethylenterephtalat (PETP) having a thickness of approximately 8-12 mm, but is may also be made from a bent pipe or rod of aluminium. Alternative materials for taking birds down as well as for other types of processing are stainless steel, other polymers, such as polyoxymethylene (POM), ceramics and composites, the only demand being that the material is approved by relevant authorities for use in food industry. When used for cutting, the engagement member is preferably a blade or disc of stainless steel with a sharp and/or serrated edge.

As mentioned above the apparatus and method according to the invention may advantageously be used when only some of the birds on the conveyor are to be processed. The selection of birds to be processed may be based on many different criteria, such as their size, weight, grade or the result of a veterinary inspection.

For this purpose the apparatus may include a tag reader and a central processing unit, equipped for receiving signals from the tag reader and sending activation signals to a drive mechanism adapted for driving the carrier. When a bird is selected, for example by a veterinary inspector finding irregularities on the bird, the bird is tagged in a manner, which may be recognized by the tag reader. The tag may be a physical or electronic tag, such as a coloured marker or an indication in a process control system, that the bird held in a particular shackle or holder is to be processed, and the actual tagging may be performed manually or automatically depending on the selection criteria and method used for the selection. The same applies to the reading of the tag. In the following the invention will be described in closer detail with reference to the drawing, where:

Figure 1:
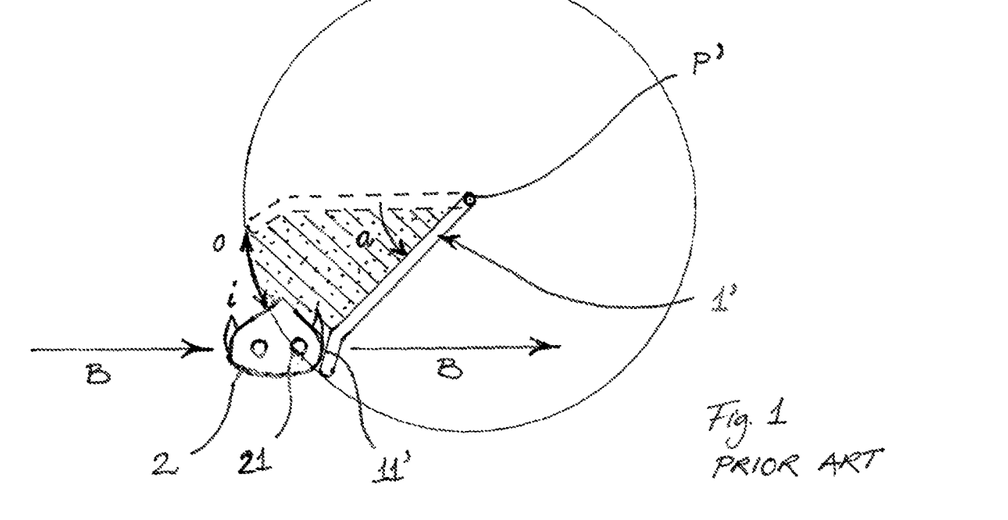
FIG. 1 illustrates the pattern of movement of an engagement member of the prior art.
Figure 2:
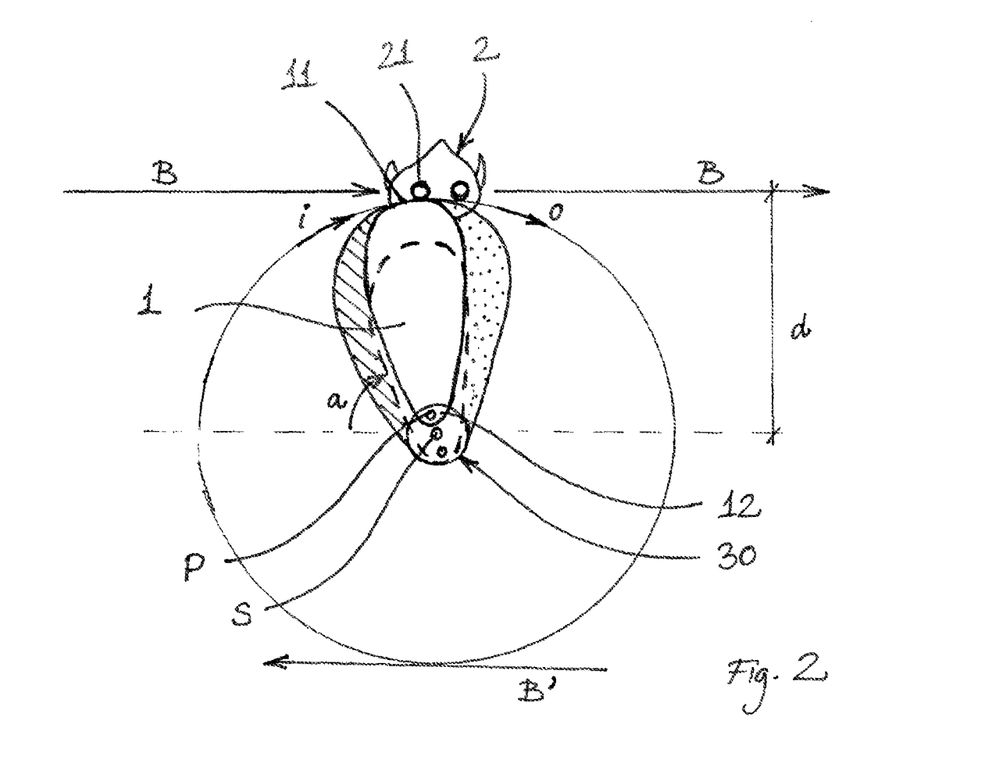
FIG. 2 illustrates the pattern of movement of an engagement member according to present the invention.

The principle of operation in a method according to the present invention is illustrated in comparison to the prior art of EP1922935 in FIGS. 1 and 2. In both cases the area covered by the engagement member 1, 1' during its movement into contact with the bird 2 is shown with a hatched signature and the area covered during the movement out of the path B of the birds is shown with a dotted signature.

Today virtually all slaughterhouses are operated with the birds hanging from both legs in shackles on an overhead conveyor and in the following the invention will therefore be described with reference to such shackles and operations. It is, however, to be understood that the invention also applies to processes where the birds are for example hanging from only one leg, or where they are not hung from shackles, but arranged in other types of holders or resting with their body on the conveyor under the influence of gravity.

The movement of the engagement member according to the invention may be seen as including three different partial movements: An inward movement i, where the engagement member 1,1' is advanced towards the path of the conveyor, a processing movement, where it follows the path B of the conveyor and is in contact with the bird 2, and an outwards movement o, where it is retracted from the path of the conveyor.

As may be seen, the prior art engagement member 1' in FIG. 1 covers substantially the same area during the inwards movement i and outwards movement o, whereas the engagement member 1 according to the invention in FIG. 2 covers different areas. In other words, in the method according to the prior art the angle a of movement of the engagement member is increasing during the inwards movement and decreasing during the outwards movement, whereas with the present invention the angle a of movement is still increasing during the outwards movement.

As may also be seen from FIG. 2, the direction of movement of the contacting surface 11 of the engagement member 1 according to the invention during the processing movement is substantially the same as the direction of the path B of the conveyor and hence the direction of transport of the birds. This means that though the contacting surface may follow a curved overall path, it will, at least at one point, follow the same direction as the bird.

In FIGS. 1 and 2 the engagement members 1,1' are shown in full line in their active positions, where they are in engagement with a bird 2, and in broken lines in their passive positions. In the embodiment in FIG. 2, the engagement member 1 is drop-shaped with a rounded distal end serving as the contacting surface 11 engaging the birds and a pointed proximal end 12 being connected to a carrier 30 at a primary axis P.

The arrow B' in FIG. 2 indicates the possibility for also providing a second conveyor carrying birds in the opposite direction on the opposite side of the apparatus. This second conveyor may be a separate conveyor carrying a second stream of birds, but it also possible to arrange the first conveyor with a turn (not shown), so that it passes the apparatus on both sides, thus potentially doubling its capacity. The engagement member 1 may then be made extra long, for example having the overall shape of the number eight, and with a part extending from the carrier to the second conveyor. Such two-sided operation is, however, only suited for processes where all birds, every other bird or birds arriving at a similarly regular interval have to be processed. This applies to all types of processes, not only to take-down. To avoid damages to the birds and potential malfunction of the apparatus, the contacting surface 11 of engagement members used for taking birds down is preferably convex and rounded.

Figure 3:
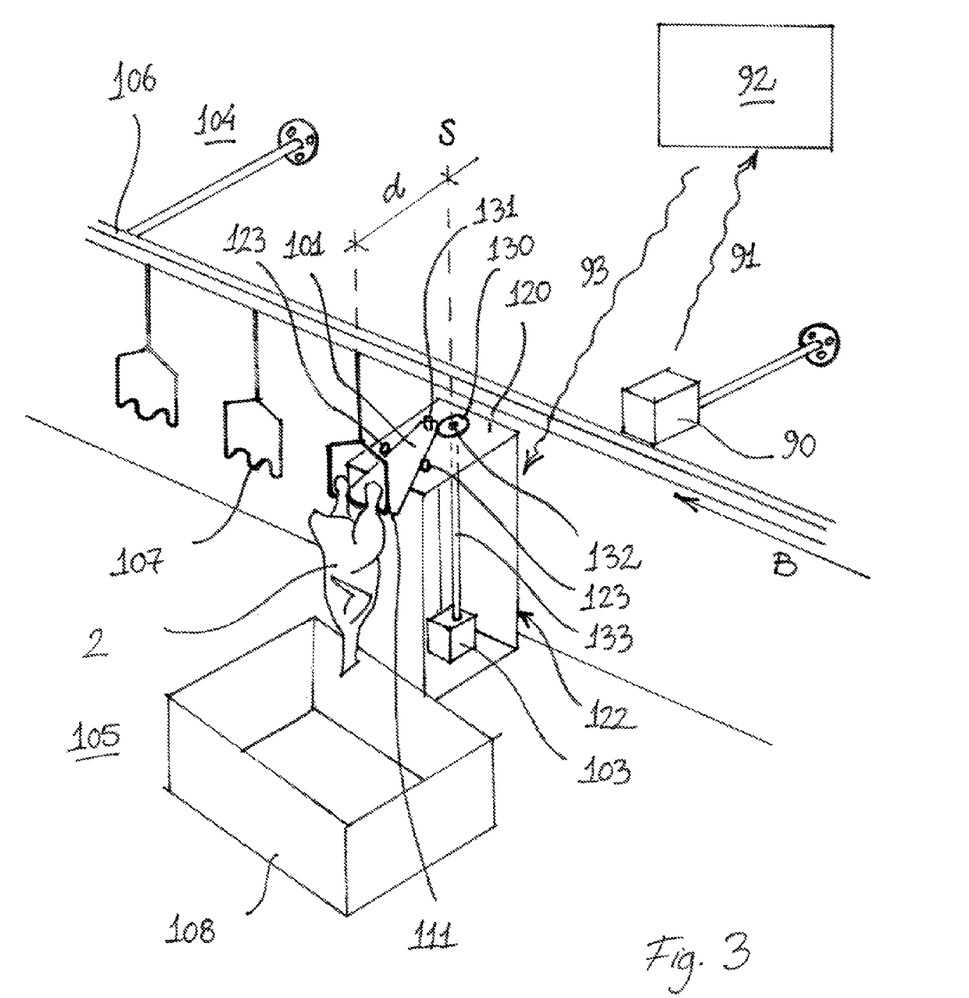
FIG. 3 is a perspective view of an apparatus according to the invention with a triangular engagement member.

Turning now to FIG. 3, an engagement member 101 of a different configuration than in FIG. 2, but adapted for following substantially the same pattern of movement, is shown. Many features of this embodiment correspond to features already described with reference to the FIG. 2 above and the same reference numbers will therefore be used, but with 100 added. If nothing else is stated, the function of such corresponding features is the same.

An overhead conveyor 106, which is mounted to the wall 104, includes a continuous series of shackles 107, here illustrated by only three for the sake of clarity and only one carrying a bird 2. The conveyor is arranged at a distance d from the carrier 130 and hence from the primary axis P (131) as may also be seen in FIG. 2, said distance corresponding substantially to the distance between the primary axis and the contacting surface(s) 111 of the engagement member 101, when the distance between the primary axis P and the secondary axis S (132) is relatively small.

The carrier 130 is here mounted on a top plate 120 of a housing 122, said housing serving as a base member of the apparatus. Restraints 123 are attached to the top plate 120 on either side of the engagement member 101, preventing a centre section of the engagement member from moving sideways in parallel with the path of the conveyor. Bearings (not shown) may be provided on the carrier 130 and/or the top plate 120 of the housing for supporting the engagement member.

In comparison, the primary axis P' of the prior art engagement member 1' illustrated in FIG. 1 is located very close to the path B of the conveyor and the birds. Consequently the risk of the connector member defining the primary axis being contaminated, worn or even blocked by material from the birds is much higher with the prior art apparatus than with the one according to the invention.

In operation the shackles 107 carrying birds 2 are conveyed along the conveyor 106 in the direction B. When a shackle carrying a bird, which has to be taken down, reaches a predetermined point on the conveyor, a drive mechanism 103 is activated and rotates the carrier 130 via a drive shaft housed in a shaft bearing 133. In this embodiment the drive mechanism used for moving the engagement member 101 is located in a housing 122, resting on the floor 105 of the slaughterhouse building, and cables connecting it to a power supply, a control unit or like are hidden in the wall and/or floor. The skilled person will, however, understand that the drive mechanism and other features not directly associated with the engagement member may be embodied in many other ways without departing from the scope of the claims. For example, the drive mechanism may be arranged above the carrier, the drive shaft and shaft bearing may be embodied differently or the housing could be left out. Likewise, the drive mechanism could have a separate mounting and/or be hung from the ceiling of the slaughterhouse and the shaft bearing 133 could potentially be left out.

The drive mechanism 103 is preferably a servo motor, which is capable of high-speed operation and of running for extended periods of time with a minimum of maintenance, but other types of drive mechanisms may of course be employed.

During the rotation, the engagement member 101 is moved from a passive position corresponding to the one shown by the broken lines in FIG. 2 to the position in FIG. 3, thereby bringing the contacting surface 111 into contact with the legs 21 of the bird.

The force and speed provided by the drive mechanism 103 are such that the engagement member 101 forces the legs 21 out of the shackle 107 and the bird 2 then drops into a container 108 or onto a conveyor (not shown) underneath the conveyor 106. The exact force and speed when hitting the bird depends on a number of factors such as the type of shackles use and the size and weight of the birds, but to avoid damages it is noted that the result should be a push on the legs rather than a stroke. It is to be understood that the speed of the engagement member does not have to be constant over its entire movement into and out of the path of the conveyor 106 and during the processing it preferably travels with substantially the same speed as the conveyor. Despite this possibility for variation, the skilled person will easily arrive at a working combination of force and speed with only a few experiments once the type of birds to be processed has been determined. It will also be understood that the force and speed of the engagement member may be different when performing for example a cutting process, but that this too will be easily established by experiments.

In FIG. 3 the drive shaft is substantially vertical and the rotational movement of carrier 130 and the movement of the engagement member 101 being substantially in a horizontal plane. It may, however, be advantageous to make the movement of the engagement member and possibly also the plane of rotation of the carrier oblique so that the engagement member hits the legs 21 of the bird in an upwards direction. What is most expedient depends amongst others on the type of shackles used and on whether they hang loosely from the conveyor or are mounted in a firmer manner. Likewise, the engagement member may advantageously be angled when performing a cut. As an example it may be advantageous to advance the engagement member from above when performing a cut to open the body cavity of a bird.

Figure 4:
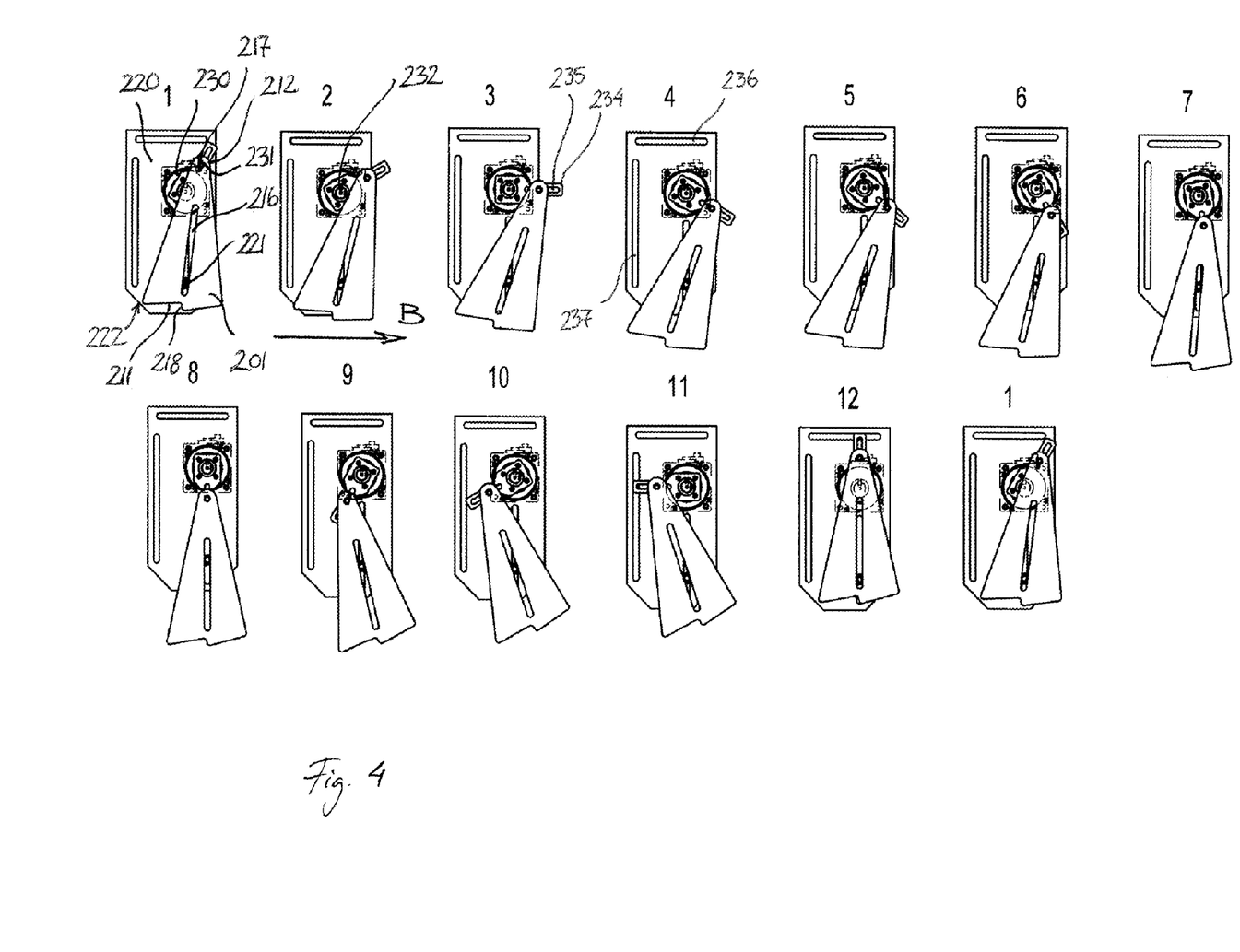
FIG. 4 is a series of sketches showing the movement of an engagement member according to a third embodiment of the invention.
Figure 5:
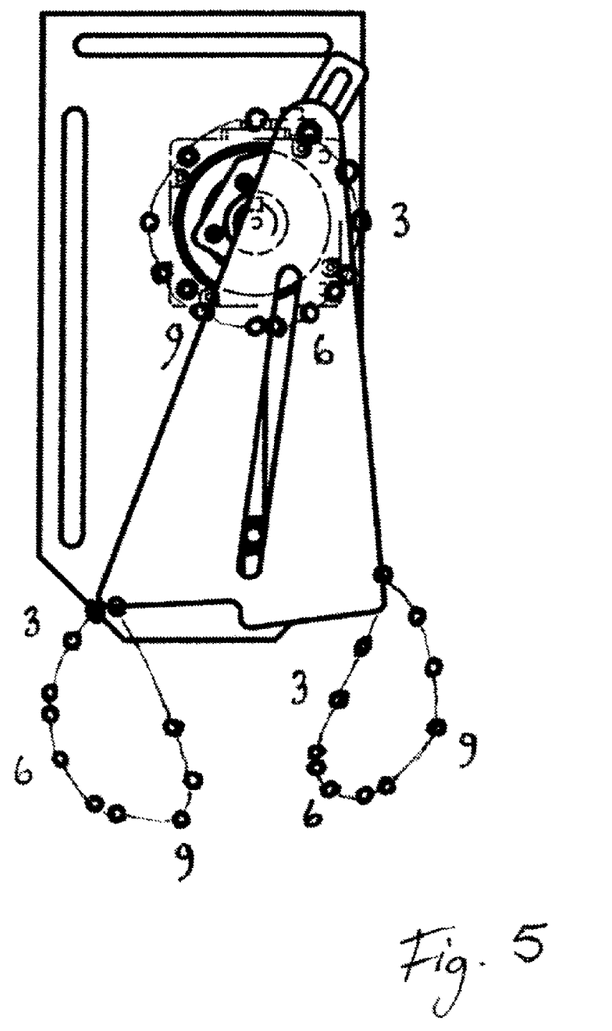
FIG. 5 is illustrates the pattern of movement of the engagement member in FIG. 4.

A more detailed embodiment of an engagement member 201 and its operation is shown in FIGS. 4 and 5. Many features of this embodiment correspond to features already described with reference to the FIGS. 2 and 3 above and the same reference numbers will therefore be used, but with 100 and 200 added, respectively. If nothing else is stated, the function of such corresponding features is the same.

As may be seen the engagement member 201 is here wedge shaped, having the overall shape of a triangle when seen in the direction of the primary axis 231, one side of the triangle forming the contacting surface 211 and the primary axis being located at a vertex of the triangle located opposite the contacting surface.

At the centre line of the triangle is an elongate guide member in the form of a longitudinal slot 216 cooperating with a restraint in the form of a guide pin 221 fixed on the top 220 of the housing 222, which serves as a base member of the apparatus. In operation this guide slot allows the engagement member to slide in relation to the restraint.

At the proximal end 212 opposite the contacting surface 211, the engagement member is connected to a carrier 230 via a shaft 231 constituting the primary axis of rotation and projecting through a hole 217 in the engagement member. The carrier 230 is mounted on the base member 220 of the apparatus and may be rotated about a secondary axis 232.

When a shackle (not shown) carrying a bird, which has to be taken down, reaches a predetermined point on the conveyor (not shown), the drive mechanism is activated and rotates the carrier 230 about the secondary axis 232 as described with reference to FIG. 4 above, whereby causing the engagement member 201 to move as will be described in further detail with reference to FIG. 5. If wishing an oblique angle of engagement as described above, the top plate 220 can simply be angled, but the arrangement of the drive mechanism should of course be adapted accordingly.

When, as seen in FIG. 4, the carrier 230 is rotated in a clockwise direction, the proximal end 212 of the engagement member 201 is forced to follow the shaft 231 and hence also follows a circular clockwise path. However, as the engagement member is restrained by the pin 221 projecting through the slot 216, the distal end with the contacting surface 211 is forced to follow a counter-clockwise path. The positions occupied by the primary axis and by the two outermost ends of the contacting surface in each of the situations shown in FIG. 4 are shown as dots in FIG. 5, where the engagement member is shown in the initial position corresponding to sketch 1 of FIG. 4. The overall pattern of movement of the engagement member, which is illustrated by the lines connecting the dots, is thus of the shape of the number eight, each end of the engagement member following oppositely directed closed-loop paths.

The movement of the engagement member 201 may be seen as including three different partial movements. Starting from the initial position in sketch 1 of FIG. 4 the engagement member is first advanced towards the path of the conveyor in an inwards movement shown in Sketches 1-3. It then follows the path B of the conveyor for a short while in a processing movement, where the engagement member is in contact with the bird, this movement corresponding to sketches 3-9. Finally, once the processing of the bird is done, the engagement member is retracted from the path of the conveyor in an outwards movement towards the initial position as illustrated by sketches 9-12. It is noted that FIG. 3 corresponds approximately to sketch 5 of FIG. 4 except for the path B of movement in FIG. 4 being opposite, and that, depending on the type of processing, the direction of movement of the engagement member during the processing movement may be opposite the direction of movement of the conveyor and the birds.

As may be seen, the contacting surface 211 in this embodiment is divided in two sections by a small step 218. Each of these sections is intended to engage one leg of the bird when using the apparatus for taking down birds from shackles. During the movement illustrated by sketches 3-7 in FIG. 4, the section to the right in FIG. 4 engages the upstream leg forcing it out of the shackle, and during the movement illustrated by sketches 6-9, the left section engages the downstream leg.

In this embodiment the distance between the primary axis, i.e. the hole 217 in the distal end 212 of the engagement member, and the contacting surface 211 is approximately 25 cm, when the apparatus is intended for processing chickens. The width of the contacting surface is approximately the same as or slightly smaller than the distance between shackles on the conveyor, which is typically 150 mm in modern poultry slaughterhouses. If intended for processing smaller or larger birds, these dimensions should of course be adjusted accordingly.

The engagement members in the drawing are preferably made from a polymer, such as polyethylenterephtalat (PETP) or Polyoxymethylene (POM), aluminium or stainless steel and when used for taking down birds from shackles it has a convexly rounded contacting surface to avoid damages to the birds. The guide slot 216 and the hole housing the shaft 231 may be provided with liners serving to lessen friction between the engagement member and the guide pin 221 and shaft 231, respectively, said liners preferably being made from a self-lubricating material.

The shaft 231 forming the primary axis here projects through an elongate hole 235 in a leg 234 projecting from the main body of the carrier 230. This allows the distance between the primary axis and the secondary axis to be adjusted, thereby adjusting the pattern of movement of engagement member and thus also of the contacting surface 211. The shaft may for example be embodied as a bolt, and the position of the shaft in relation to the leg 234 of the carrier may then be fixated by tightening a nut on the bolt, thus pressing the engagement member and the leg of the carrier towards each other. One or more elongate holes 236, 237 may also be provided in the base member 220 to allow flexibility in its connection to other members, such as a housing.

The elongate hole 235 in the carrier not only allows a manual adjustment of the apparatus as described above with reference to FIGS. 4 and 5. It also allows the distance between the primary axis and the secondary axis to be adjusted as part of the process as will be described below with reference to FIG. 6, which shows a fourth embodiment of the invention. Many features of this embodiment correspond to features already described with reference to the FIGS. 2, 3 and 4-5 above and the same reference numbers will therefore be used, but with 100, 200 and 300 added, respectively. If nothing else is stated, the function of such corresponding features is the same.

Figure 6:
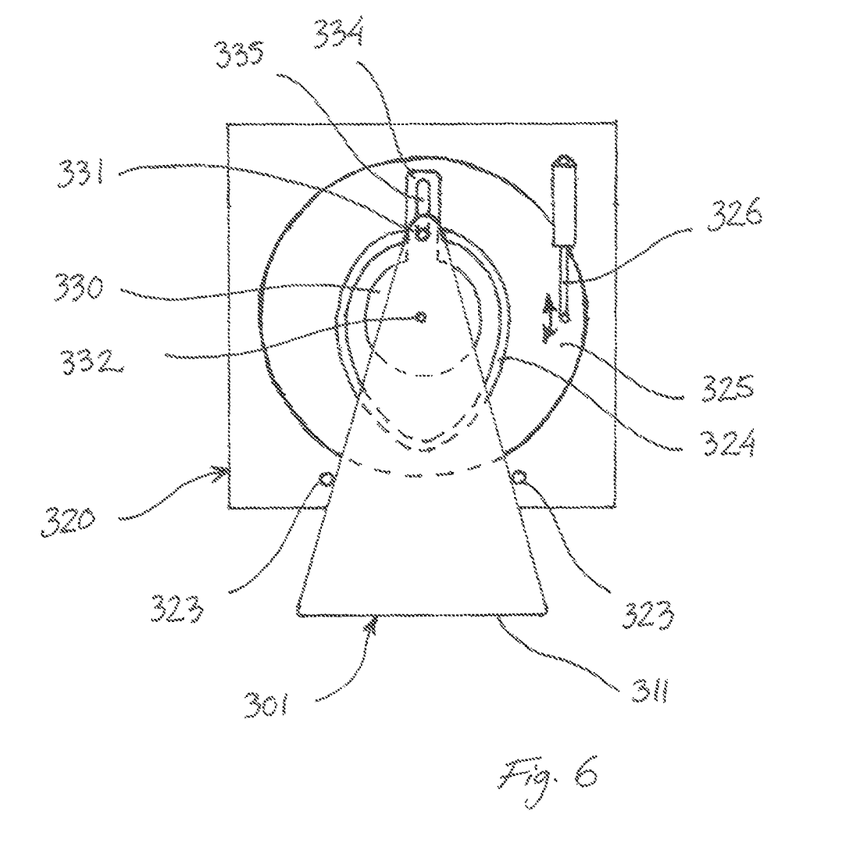
FIG. 6 shows a fourth embodiment of an apparatus according to the invention.

The engagement member 301, the drive mechanism (not shown), bearing (not shown), if any, and the restraints 323 in FIG. 6 are embodied as in FIG. 3 and will not be described in more detail here, as it will be understood that these features are independent of the features described below and may in principle be embodied as described with reference to the other figures or in other ways falling under the scope of the claims.

The shaft 331 interconnecting the engagement member 301 and the carrier 330 is here made to fit loosely into the elongate hole 335 in the projecting leg 334 of the carrier and to project underneath the underside of the carrier, i.e. into the plane of the paper in FIG. 6, and into a guide groove 324 formed in a guide plate 325 of the apparatus. When the carrier is turned about the secondary axis 332, the shaft will be forced to follow the path of the guide groove and thus be forced to move along the length of the elongate hole. For this purpose the shaft 331 may be a bolt and nut connection as described above, which is simply not tightened, but it is also possible to use a simple pin as long as it is made sure that the engagement member stays in place.

Here the guide groove 324 is shown as being egg-shaped meaning that the distance between the primary axis 331 and the secondary axis 332 will be the smallest in the position of the engagement member shown and will gradually increase until the carrier has been turned over 180 degrees. During the return movement of the carrier the distance will degrease following a similar pattern, but it is to be understood that the guide groove 324 does not have to be symmetrical and that it may even include abrupt directional changes leading to the contacting surface 311 of the engagement member being shifted relatively quickly either towards or away from the secondary axis or sideways.

As is also seen in FIG. 6, the guide plate 325, in which the guide groove 324 is provided, may be arranged to be movable so that the position of the guide groove may be changed. This may be used for adjusting the apparatus to compensate for example for differences in the sizes of the birds to be processed, but it is also possible to use this adjustment for achieving a desired pattern of movement of the engagement member, thus moving the guide plate one or more times during each rotation of the carrier.

Here the adjustment is achieved by an actuator 326 being connected to the guide plate 325 at its periphery and adapted for turning it slightly as indicated by the double arrow. It will, however, be understood that the activator need not be a cylinder with a piston as shown, but may for example rely on a gear wheel engaging teeth the guide plate, and/or that the activator may be hidden inside a housing. Here the guide plate 325 is arranged in a circular recess in a base member 320, but it will be understood that the it may also be arranged to rotate on an axle. The shaft bearing 133 in FIG. 3 may serve this purpose, but it is noted that the axis of rotation of a guide plate as the one in FIG. 6 does not have to coincide with the secondary axis, and that an opening may be provided in such a guide plate to make room for the drive mechanism used for rotating the carrier.

The thickness of the engagement member is preferably in the interval of 5-20 mm depending amongst others on the material, the type of birds to be processed and the intended speed of operation. In the choice of material and dimensions due consideration should be given to strength, stiffness, weight, wear, resistance to cleaning agents and the risk of damaging the birds.

The selection of birds to be processed may be based on many different criteria, such as their weight, grade or the result of a veterinary inspection. If for example wishing to sort the birds in different weight classes, each bird will be weighed in a weighing station (not shown) and each shackle carrying a bird belonging to a predetermined weight interval will be tagged with a corresponding take-down indication. Similarly, a veterinary inspector may tag birds with defects when they pass an inspection station (not shown) and/or a quality grader may be employed.

The tag may be a physical tag, such as a coloured marker or an arm turned to a different position, or an electronic tag in a process control system. Tagging may be performed manually or automatically, the automatic tagging for example being performed by a scale or a vision based control system in a manner known per se.

It is of course possible to use two or more different tags in the same process, for example tagging birds that are rejected by the veterinary inspector with one type of tag and birds that are under-sized with another type of tag. In a take-down process two or more take-down stations each designed for taking birds having a particular type of tag can then be provided. Similar tagging may of course be applied in other processes, for example tagging very large birds where a cut has to be made extra deep.

The timing of the process, i.e. the position of the predetermined point on the conveyor where the drive mechanism is activated, depends on the speed of the conveyor and on the speed and size of the engagement member, but may be easily determined by simply running a few birds through the system.

The method of activation of the drive mechanism depends on the type of tags used. In many slaughterhouses today the shackles are tracked using an electronic control system and by tagging the shackle electronically this control system may also be used for activating the drive mechanism of the apparatus. It is, however, also possible to provide a mechanical trigger mechanism, where an activation signal is sent to the drive mechanism, when for example a raised arm on the shackle hits a switch or breaks light beam. Likewise, a vision-based system may be provided for detecting coloured tags and sending activation signals to the drive mechanism, or an operator may hit an activation switch manually when he sees a tagged shackle arriving at the predetermined point. In FIG. 3 the overall principle of this type of communication is illustrated by a tag reader 90, sending a reading signal 91 to a central processing unit 92, which again, if the reading signal indicates that a bird has to be taken down, sends an activation signal 93 to the drive mechanism 103. When the system is as simple as shown in FIG. 3, the processing unit 92 may of course be located in the housing 122 together with the drive mechanism, but typically the processing unit will be a central computer also serving other purposes in the slaughterhouse.

Above the interaction between the central processing unit 92 and the drive mechanism 103 is described in very general terms and it is to be understood, that the drive mechanism and/or the central processing unit is programmed or otherwise adapted for providing the desired pattern of movement of the engagement member. As an example, a system for taking down birds as described with reference to FIGS. 4 and 5 will be programmed or otherwise adapted so that the carrier completes one full rotation when it receives an activation signal, whereas other processes may require only a partial rotation, several rotations, that the rotation is stopped and restarted one or more times during the processing cycle or that the speed of rotation is changed during the rotation. Additional control signals may be sent from the central control unit to the drive mechanism to control such processes and/or the drive mechanism may include a separate control unit adapted for controlling the processing cycle once having received an activation signal from a central control unit.

The controlling of the drive mechanism may be based on the use of encoders on the conveyor and on a drive shaft connected to the carrier, these encoders sending information of the position of the conveyor and the drive shaft to the central control unit. If for example the speed of the conveyor decreases, the central control unit may calculate an adjusted speed profile for the carrier and send new control signals to the drive mechanism and vice versa if the drive shaft has for some reason come out of step with the conveyor. Encoders determining the position of the conveyor and communicating this information to a central control unit are already common in poultry slaughtering systems.

The use of encoders involves a division of the movement into sections, the distance between two shackles on a conveyor typically being divided in 1000 or 2048 encoder steps. When intending to move the carrier at different speeds during different parts of a processing cycle, such a division may advantageously be used for defining sections, where the carrier should run at particular, different speeds.

As it will be understood by the skilled person the apparatus and method according to the invention is suited not only for bringing an engagement member into contact with the legs of a bird hanging for a shackle, but may be used for bringing any kind of tool into contact with the bird. The engagement member may therefore be embodied in numerous other ways than the ones shown in the drawing. One example is the provision of a cutting mechanism arranged on the underside of an abutting engagement member and adapted to making a vertical cut. When moving the abutting engagement member into contact with the legs, the cutting engagement member would be located directly opposite the breast of the bird and could then be activated and used for making a cut along the sternum, thus loosening the breast fillet. In another embodiment a cutter mounted in a similar manner could be used for opening the body cavity prior to evisceration. In still another embodiment an engagement member, which may be adapted for cutting, pushing and/or pulling, is used for loosening tissue, for example loosening the skin from the breast of the bird. In a still further embodiment the engagement member carries a sensor or probe intended for measuring the temperature of the bird or taking a tissue sample. This can be done by providing a temperature sensor or scraper, respectively, on the contacting surface of any of the engagement members shown in the drawing and described above. It is noted that any such tool may be regarded as part of the engagement member and that it is therefore sufficient that the tool comes into contact with the bird. Accordingly, though the invention has primarily been described with reference to take-down-processes above, it will be understood that unless otherwise stated different features and operations described may also be used in other types of processes and other types of apparatuses. Likewise, features and operations described may be combined in alternative ways without departing from the scope of the claims.

The invention claimed is:

1. An apparatus for processing birds on a conveyor, including an engagement member, which is moveable and has a contacting surface adapted for being brought into contact with the bird, where the engagement member is connected to a carrier at a primary axis, said carrier being rotatable about a stationary secondary axis and the primary axis being located on the carrier at a distance from the secondary axis, so that said primary axis will rotate about the secondary axis when the carrier is rotated, where both the primary axis and the secondary axis are located at a distance perpendicular to the primary axis from the intended path of the conveyor, and where the engagement member is restrained by one or more restraints located between the primary axis and the contacting surface, so that the contacting surface is prevented from rotating about the secondary axis.

2. The apparatus according to claim 1 and adapted for taking down birds from the conveyor, where the contacting surface is adapted for being brought into contact with at least one leg of each bird.

3. The apparatus according to claim 2 and adapted for processing selected birds on the conveyor.

4. The apparatus according to claim 3, wherein said apparatus includes a tag reader and a central unit, is equipped for receiving signals from the tag reader and sends activation signals to a drive mechanism adapted for driving the carrier.

5. The apparatus according to claim 2, wherein said contacting surface is adapted for taking down birds from shackles on an overhead conveyor.

6. The apparatus according to claim 1, where the primary axis is located opposite the contacting surface on the engagement member.

7. The apparatus according to claim 1, where the one or more restraints are arranged on a base member of the apparatus.

8. The apparatus according to claim 7, where the guide member is adapted to slide in relation to a fixed restraint on the base member.

9. The apparatus according to claim 8, wherein said guide member is a slot in the engagement member.

10. The apparatus according to claim 1, where the engagement member includes an elongate guide member extending over at least a part of the distance between the primary axis and the contacting surface.

11. The apparatus according to claim 1, where the engagement member has the overall shape of a triangle when seen in the direction of the primary axis, one side of the triangle forming the contacting surface and the primary axis being located at a vertex of the triangle located opposite the contacting surface.

12. The apparatus according to claim 1, where the contacting surface includes two or more sections each intended for engaging one leg of a bird.

13. The apparatus according to claim 12, where the two sections of the contacting surface are arranged at different angles in the plane of movement of the engagement member.

14. The apparatus according to claim 1, where the engagement member has an undulating shape, forming a series of contacting surfaces arranged adjacent to each other.

15. A method for processing birds on a conveyor moving the birds along a path of the conveyor in a direction of movement, where an engagement member is moved to bring a contacting surface thereof into contact with a bird, where the contacting surfacing is moved along a path constituted by an inward movement from a passive position into the path of the conveyor, a processing movement which is substantially following the path of the conveyor, and an outward movement out of the path of the conveyor and back to the passive position, said inward and outward movements following the same direction of rotation, where the engagement member is connected to a carrier at the primary axis and said carrier being rotated about a stationary secondary axis, where the primary axis is located on the carrier at a distance from the secondary axis, so that said primary axis rotates about the secondary axis, and where the engagement member is restrained at one or more points between the primary axis and the contacting surface, so that the contacting surface is prevented from rotating about the secondary axis.

16. The method according to claim 15, where the engagement member is brought into contact with at least one leg of a bird, thereby taking the bird down from the conveyor.

17. The method according to claim 16, where birds are taken down from shackles on an overhead conveyor.

18. The method according to claim 15, where only selected birds on the conveyor are processed.

19. The method according to claim 15, where the contacting surface comes into contact with one leg at a time.

20. The method according to claim 19, where said contacting surface contacts an upstream leg before a downstream leg when seen in the direction of movement of the conveyor.

21. The method according to claim 15, where, during the processing movement, the direction of movement of the contacting surface is substantially the same as the direction of the conveyor.

22. The method according to claim 15, where, at least during the inwards and outwards movements, the engagement member slides in relation to a fixed restraint.

23. The method according to claim 22, wherein said engagement member includes an elongate guide member adapted for sliding over a restraint and extending over at least a part of the distance between the primary axis and the contacting surface.

24. The method according to claim 15, where a bird selected to be processed or its positions on the conveyor is provided with a tag, where the tag is read by a tag reader, which sends a reading signal to a central processing unit, and where the central processing unit sends an activation signal to a drive mechanism adapted for driving the carrier.

25. A method for taking selected birds down from shackles on an overhead conveyor moving the birds along a path of the conveyor in a direction of movement, including the following steps:
   selecting at least one bird to be processed by selecting at least one of said at least one bird or a shackle positioned on a conveyor carrying said at least one bird,
   providing each bird selected to be processed or its position on the conveyor is with a tag,
   reading each tag with a tag reader, which sends a reading signal to a central processing unit, which again sends an activation signal to a drive mechanism adapted for driving a carrier of a take-down station, said carrier being connected to an engagement member at a primary axis and said carrier being rotatable about a stationary secondary axis, where the primary axis is located on the carrier at a distance from the secondary axis, so that said primary axis rotates about the secondary axis, and where the engagement member is restrained at one or more points between the primary axis and a contacting surface adapted for being brought into contact with the bird, so that the contacting surface is prevented from rotating about the secondary axis,
   moving the engagement member to bring the contacting surface thereof into contact with at least one leg of the selected bird, where the contacting surfacing is moved along a path constituted by an inward movement from a passive position into the path of the conveyor, a processing movement which is substantially following the path of the conveyor,
   moving the engagement member out of the path of the conveyor and back to the passive position in an outward movement, said inward and outward movements following the same direction of rotation.

* * * * *